United States Patent
Jarczyk

(10) Patent No.: US 8,686,945 B2
(45) Date of Patent: Apr. 1, 2014

(54) DATA PROCESSING DEVICE INPUT APPARATUS, IN PARTICULAR KEYBOARD SYSTEM AND DATA PROCESSING DEVICE

(75) Inventor: Alexander Jarczyk, Freising (DE)

(73) Assignee: QUALCOMM Incorporated, San Diego, CA (US)

( * ) Notice: Subject to any disclaimer, the term of this patent is extended or adjusted under 35 U.S.C. 154(b) by 609 days.

(21) Appl. No.: 12/439,157

(22) PCT Filed: Aug. 24, 2007

(86) PCT No.: PCT/IB2007/003387
§ 371 (c)(1),
(2), (4) Date: Dec. 18, 2009

(87) PCT Pub. No.: WO2008/026072
PCT Pub. Date: Mar. 6, 2008

(65) Prior Publication Data
US 2010/0085308 A1 Apr. 8, 2010

(30) Foreign Application Priority Data
Aug. 28, 2006 (DE) .................. 10 2006 040 259

(51) Int. Cl.
*G06F 3/02* (2006.01)
(52) U.S. Cl.
USPC ............. 345/168; 361/679.14; 715/773
(58) Field of Classification Search
USPC ............. 345/173–178, 168, 169; 361/679.11–679.16
See application file for complete search history.

(56) References Cited

U.S. PATENT DOCUMENTS

| | | | | |
|---|---|---|---|---|
| 3,005,441 A | * | 10/1961 | Glasscock | 401/8 |
| 5,067,834 A | * | 11/1991 | Szmanda et al. | 400/489 |
| 5,410,333 A | * | 4/1995 | Conway | 345/169 |
| 5,644,338 A | * | 7/1997 | Bowen | 345/168 |
| 5,707,160 A | * | 1/1998 | Bowen | 400/472 |
| 5,977,886 A | * | 11/1999 | Barile et al. | 341/20 |
| 6,016,755 A | * | 1/2000 | Trapani | 108/50.01 |
| 2003/0026066 A1 | * | 2/2003 | Te Maarssen et al. | 361/680 |
| 2003/0197687 A1 | * | 10/2003 | Shetter | 345/173 |
| 2004/0004603 A1 | * | 1/2004 | Gerstner et al. | 345/169 |
| 2004/0140961 A1 | * | 7/2004 | Cok | 345/175 |
| 2004/0169593 A1 | | 9/2004 | Olodort et al. | |

(Continued)

FOREIGN PATENT DOCUMENTS

WO WO-2006052175 5/2006

*Primary Examiner* — Koosha Sharifi-Tafreshi
(74) *Attorney, Agent, or Firm* — Mahamedi Paradice Kreisman LLP

(57) ABSTRACT

The invention relates to a data processing device input apparatus (1) for inputting characters, in particular graphics characters and/or commands, by—manual actuation, in particular finger contact with input field elements (3) of an input field (4), the input field (4) being divided into two input partial fields (5, 6), the individual input partial fields (5, 6) being arranged on a base (7) so as to be set apart from each other viewed in the axial direction, and the input surfaces (24, 25) of the input partial fields (5, 6) opposing each other in the working position and a reproduction component (8) for the visual detectability of the input surfaces (24, 25) of the input field (4) being associated with said input surfaces. This may be advantageous as a result of the fact that the input partial fields (5, 6) are pivotably articulated to the base (7) so as to be set apart from each other and the reproduction component (8) is arranged on the base (7) between theoretical pivot axes (A5, A6) of the input partial fields (5, S) or is integrated in the base (7).

15 Claims, 5 Drawing Sheets

(56) References Cited

U.S. PATENT DOCUMENTS

| | | | |
|---|---|---|---|
| 2005/0057891 A1* | 3/2005 | Madsen et al. | 361/680 |
| 2005/0104855 A1* | 5/2005 | Grossmeyer | 345/169 |
| 2007/0102384 A1* | 5/2007 | Albenda | 211/85.26 |
| 2009/0213081 A1* | 8/2009 | Case, Jr. | 345/173 |

* cited by examiner

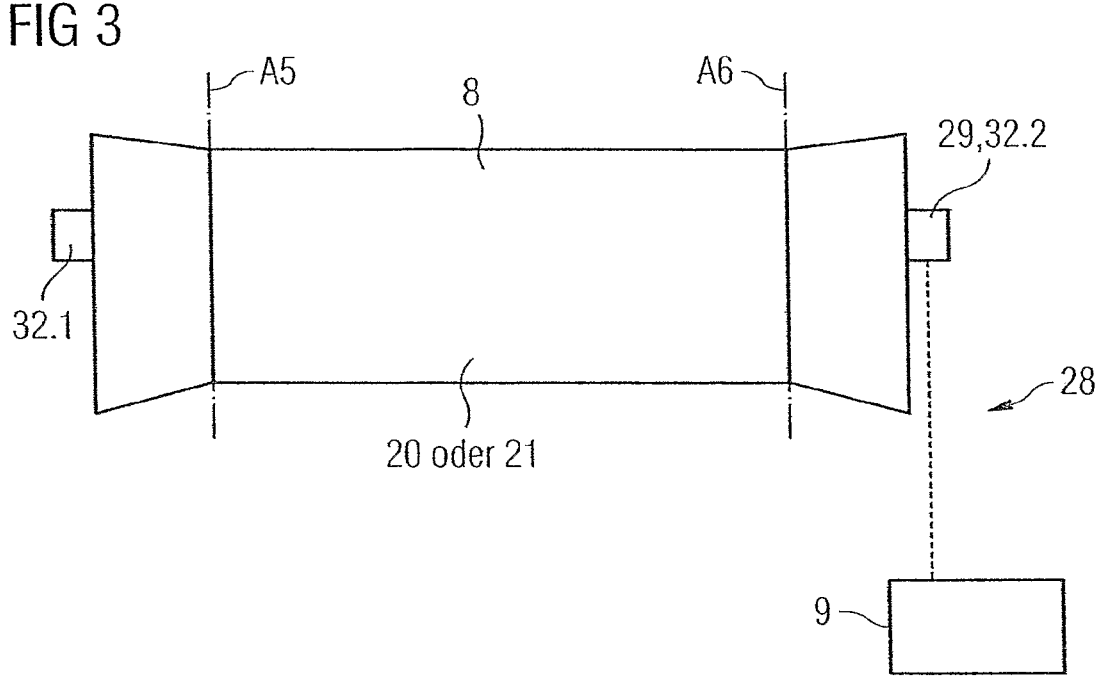
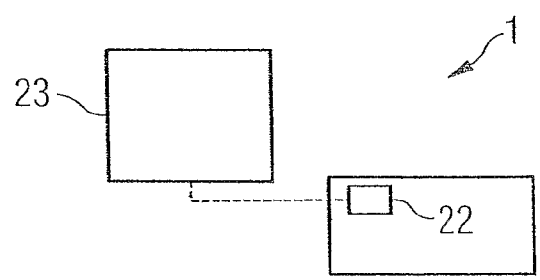

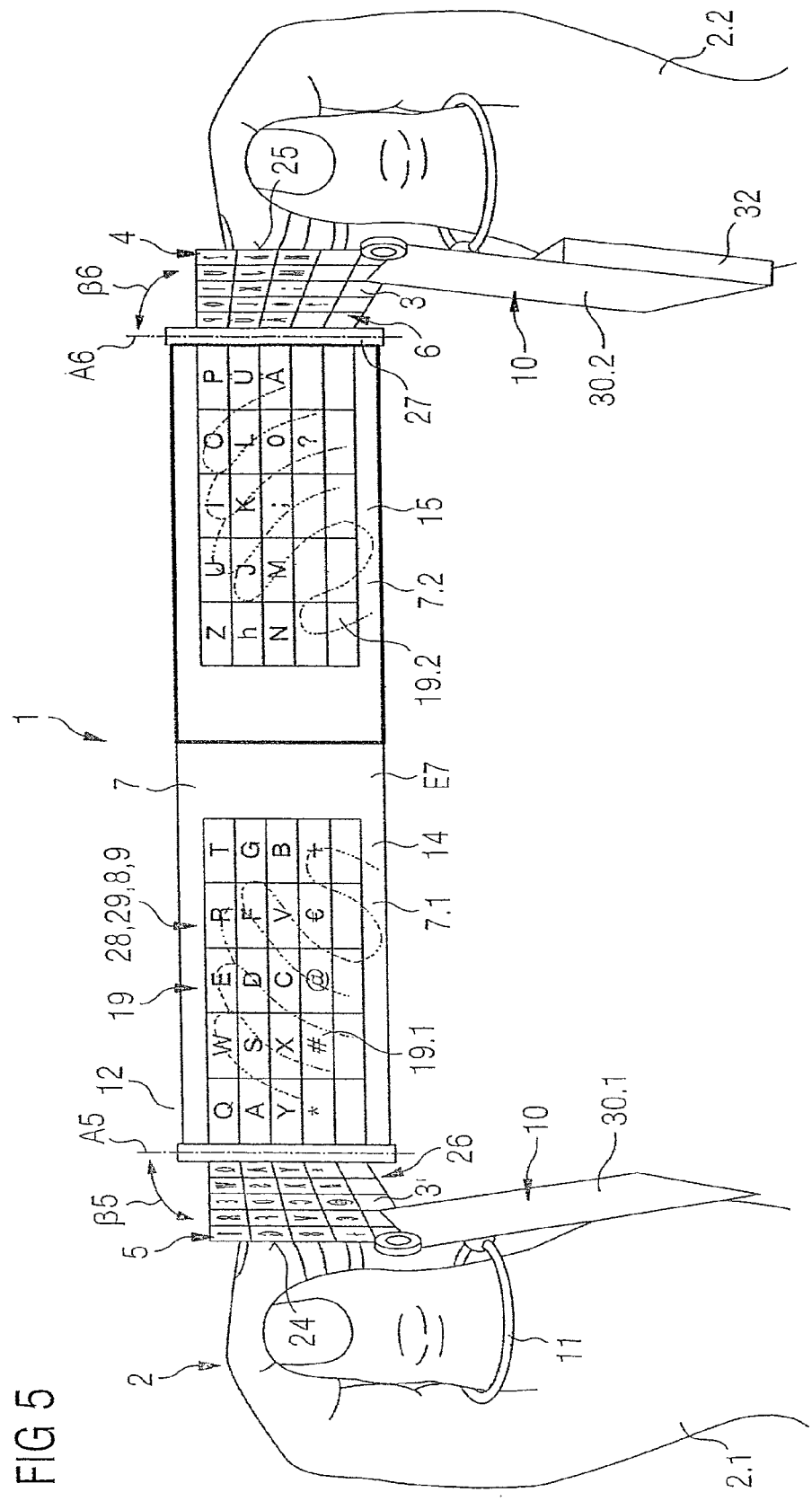

DATA PROCESSING DEVICE INPUT APPARATUS, IN PARTICULAR KEYBOARD SYSTEM AND DATA PROCESSING DEVICE

RELATED APPLICATIONS

This application is a national phase application of PCT application PCT/IB2007/003387, entitled "DATA PROCESSING DEVICE INPUT APPARATUS, IN PARTICULAR KEYBOARD SYSTEM DATA PROCESSING DEVICE", filed Aug. 24, 2007 and claims priority from German Patent Application 510763DE filed Aug. 28, 2006 entitled "DATENVERARBEITUNGSGERAT-EINGABEEINRICHTUNG, INSBESONDERE TASTATURSYSTEM UND DATENVERARBEITUNGSGERAT." All of the aforementioned applications are hereby incorporated by reference in their entirety.

The invention relates to a data processing device input apparatus for selecting and/or inputting characters, in particular, but not exclusively, to graphics characters and/or control instructions, and to a data processing device comprising a data processing device input apparatus of this type.

Data processing device input apparatus in the form of keyboard systems are known in a wide range of embodiments for computers and typewriters. These apparatus comprise an input field having input field elements which can be activated by finger contact or actuation and supply the corresponding character to the data processing device. The arrangement of the characters of an input field is in this case very highly standardised and corresponds to the ten-finger system for operating typewriters, there being provided in this case a QWERTY or QWERTZ arrangement depending on the type of character used. Also possible is an implementation as an arrangement with other characters, for example for Japanese or Chinese. The operator's palms are thus turned over, owing to the fact that the input fields are arranged in his viewing direction, in such a way that the bottoms of his palms point toward the input surface of a keyboard of this type. However, this corresponds to a rather unnatural working posture owing to the twisting of the wrist, thus causing pain, inflammation and swelling in the region of the wrist, especially of the carpal tunnel region, in particular during relatively long input operations without suitable regeneration time. Excessive repetition over a given period of time and insufficient regeneration breaks can, over relatively long periods, lead to permanent damage or even disability. The development of ergonomic keyboards is therefore of considerable importance. Known in this regard are keyboard embodiments which eliminate difficulties associated with inappropriate, illogical keyboard actuation in that, for example, the known QWERTY arrangement is broken down into a centrally divided format and the two resultant input fields are rotated relative to each other. The divided input fields are in this case arranged as separate input fields or else on a common transverse plate, in particular a base.

U.S. Pat. No. 3,990,565 discloses a keyboard for a typewriter that is arranged so as to be divided into two input fields between which there may optionally be formed an additional space in which, for example, a document may be arranged. A further embodiment of a conventional, optionally splittable keyboard is described in U.S. Pat. No. 4,661,005. The keyboard comprises keypad units each consisting of two portions, one portion remaining horizontally oriented at all times, set so as to be partially rotatable to an inclination of 45 degrees with respect to a lateral incremental axis oriented in the longitudinal direction. This increases the degree of comfort for the hands of the person operating the keyboard. The difficulty with this embodiment is that the inclination can in some cases make it difficult for the user to read individual characters attached to the tops of the keys. A proposed solution to this problem involved additionally attaching similar characters to the upwardly oriented lateral surface of each digital key, the visibility of the key characters increasing in this slightly inclined position.

WO 93/14936 discloses a keyboard such as may be used for data processing devices, the keyboard also comprising a split input field. This keyboard comprises a keyboard frame which has a relatively rigid structure and can be arranged when in use transversely over the lap of an operator, the frame or the base defining a reference direction when the frame is arranged transversely over an operator's lap. The input field is divided into two input partial fields and is formed by what are known as keypad elements. There are provided both a left-hand and a right-hand keypad element which are set apart from each other and extend from the keyboard frame substantially vertically upward, so a vertically oriented keypad surface respectively points in the corresponding direction toward the left or right. In other words, the individual input surfaces oppose one another. This provides a substantially neutral wrist position and a substantially neutral wrist rotational position during actuation as a result of the fact that the operator's hands can be arranged in such a way that his palms face each other. The problem of the representation and detectability of the keys for the user is solved by mirrors arranged after and immediately outside the keypad element. The mirror is in this case arranged so as to display the individual vertically oriented keypad surfaces so that the operator is able to view them.

Although keyboards of this type are ergonomically especially advantageous for the operator, a key problem is that the operator has merely limited detectability on actuation, as the reproduction means also directly reflects the concealment of the keypad surfaces. For the user, in particular a user unversed in the ten-finger writing system, inputting without full visibility of the input field elements is very difficult and involves considerable effort. Furthermore, the construction of the keypad system described in said document means that the system is relatively bulky, thus restricting its suitability for mobile applications, or the rigid link to the base surface means that use as a portable computer, in particular, entails considerable enlargement.

With the foregoing in mind, an object of the invention may be considered to be to develop a data processing device input apparatus so as to allow the optimised ergonomic position to be maintained as far as possible as the working position, whereas individual adaptations to the anatomical conditions of different operators should be possible, especially as far as the distance between the individual input fields and also the accessibility thereof are concerned. Optionally, or preferably, improved detectability of the actuated keys should also be facilitated, the arrangement thus allowing the individual keys to be viewed conveniently and directly. The data processing device input means may optionally, or preferably, also be distinguished by suitability for mobile applications and its construction may be as small as possible, thus allowing the device to be transported while taking up as little space as possible and linked to other devices and means of communication.

Viewed from one aspect this object may be achieved by the data processing device input apparatus or the data processing device having the features according to claims 1 and 19. Other, and possibly advantageous, embodiments form the subject-matter of dependent claims.

A data processing device input apparatus for selecting and/or inputting characters, in particular graphics characters and/or commands, by contacting input field elements of an input field by the finger of a human hand has two input partial fields which are articulated to a base at an angle thereto. The input partial fields are set apart from each other, a right-hand and a left-hand input partial field being provided. A left-hand spaced-apart input partial field extends in the base substantially at an upward angle, so its input field surface oriented at this angle points toward the left-hand side, whereas the right-hand spaced-apart input partial field extends from the base substantially at an upward angle, so its angled input field surface points toward the right-hand side, thus facilitating a reproduction component for the visual display and detectability of the operating or input field surfaces by the operator. Optionally, or preferably, the input partial fields are pivotably articulated to the base element so as to be set apart from each other. The articulated connection is produced in this case optionally, or preferably, in the region of the outer axial end regions of the base element and optionally, or preferably, in the respective end regions of the individual input partial fields. This ensures that the input partial fields can, if necessary, be folded or pivoted on the base plane in a working position in which the input surface which can be defined by the input field elements is oriented substantially in the vertical direction or at an angle thereto and points toward the inner surfaces of the operator's hands when these are set apart from each other in the typical working position, the inner surfaces facing each other. This base forms in this case at least one base surface characterised at least by a plane. Optionally, or preferably, the base surface is planar, so the two input partial fields can be folded into the base plane. It is also possible to arrange the input partial fields at an angle to each other, so merely partial pivoting through a specific angle is carried out, the input partial fields comprising the base surfaces being able to rest flat in the two base partial planes in this case too. The latter option may afford particular advantages, especially if the base is used as a reproduction means.

An optional, or preferred, apparatus further comprises a reproduction component for the visual detectability of the input field elements and actuation thereof. The reproduction component is arranged between the swivel axes of the input partial fields and thus optionally, or preferably, in the region of the base, the reproduction component being either articulated to the base or formed thereby. Optionally, or preferably, the reproduction component is arranged on the base within the extension in the direction of the width of the input partial fields and therefore of the corresponding required extension of the pivot axis. In the working position, the reproduction component therefore allows representation or a visual impression of the actuation of the input field by the operator, the reproduction component being located in the field of vision and thus in view of the operator, or the operator has merely to swivel his head downward and a uniform input field is projected onto the reproduction component.

The reproduction component receives the image from a detection and recording component. Along with a transmission component, these form a module for displaying the input partial fields.

The reproduction component may be embodied in a large number of possible ways, depending, in particular, on the system used. If use is made of a simple optical mirror system according to a first, and possibly especially advantageous, embodiment, no further additional elements are required; instead, the base surface is in the form of a mirror, the input partial fields being transparent and having applied thereto the appropriate characters in the correct writing position, looking onto the operating surface, so, owing to the transparency, the characters are applied in mirror-inverted form to the back, i.e. the surface pointing away from the respective bottom of the operator's hand, and, owing to the mirror element or elements arranged on the base surface, a correct image is produced on said surface. This solution allows very low design costs. There is no need for additional components for recording and transmitting a corresponding image.

According to a second embodiment, a further possibility is to install thereon a component for producing an image of the input partial fields and input partial field surfaces and to transfer via a component for transmitting to the reproduction component. In this case, the reproduction component may be of various configurations. Embodiments as monitors or screens are possible. The component for producing and detecting a corresponding image is optionally, or preferably, in the form of a camera which detects the images on an ongoing basis and transmits them to the reproduction component via corresponding transmission component, by radio, infrared or by cable. A corresponding camera has in this case to be allocated to each individual input partial field. The technical implementation of this embodiment is somewhat more expensive, although it may have an advantage that the image produced is produced independently of the operator's position of observation. In this case, there is also no need for the input partial field to be correspondingly transparent. The input partial fields may therefore be configured in any desired embodiment. An embodiment as keys or the like is conceivable.

No restrictions are placed on the theoretically possible embodiment of the individual input field elements. The actuation of an input field and the character associated therewith is transmitted mechanically or physically, in the latter case especially capacitively. In mechanical solutions, a pressure signal is generated on actuation on a corresponding input field which is transmitted, whereas in the other case there is provided a sensor which detects a contact and responds to heat or being touched. In terms of transmission, there are therefore also the same options as in conventional computer keyboards. The corresponding signal is then converted into the corresponding character and transmitted.

According to an optional, or possibly especially advantageous, development, the base is also divided and can be folded up to provide an especially compact embodiment, the foldability being achieved by the provision of a swivel axis in the region of the centre of the base, and the base thus being divided into two base partial elements which are able to pivot in any desired manner relative to each other and are optionally, or preferably, able to be folded up relative to each other from a flat-contact position to a position having a swivel angle of 180 degrees. It is thus also possible, especially if the reproduction component is in the form of a mirror, to adapt the mirror image accordingly to the inclination of the input partial fields in order to prevent distortion of the mirror image. The foldability also allows the axial distance between the two input partial fields to be influenced.

If an interface is provided, an optional, or preferred, input apparatus may be in the form of a separate component for linking to existing systems, in particular data processing devices, for example in the form of computers. The linking can be carried out via cables or wirelessly, for example by radio or infrared. According to an optional, or especially advantageous, embodiment, the data processing device is in the form of a device for communication, especially a mobile radio device, and the data processing device input apparatus is integrated therein.

An embodiment of the invention will be described hereinafter in greater detail with reference to the drawings, in which:

FIG. 2b shows a folded-up position, in particular a position for transporting a data processing device input apparatus according to FIG. 2a;

FIG. 3 shows a possible embodiment of a representation component;

FIG. 4 shows an embodiment of a link to a data processing device; and

FIG. 5 shows an integration into a device for communication, in particular into a mobile radio device.

Figure 1:
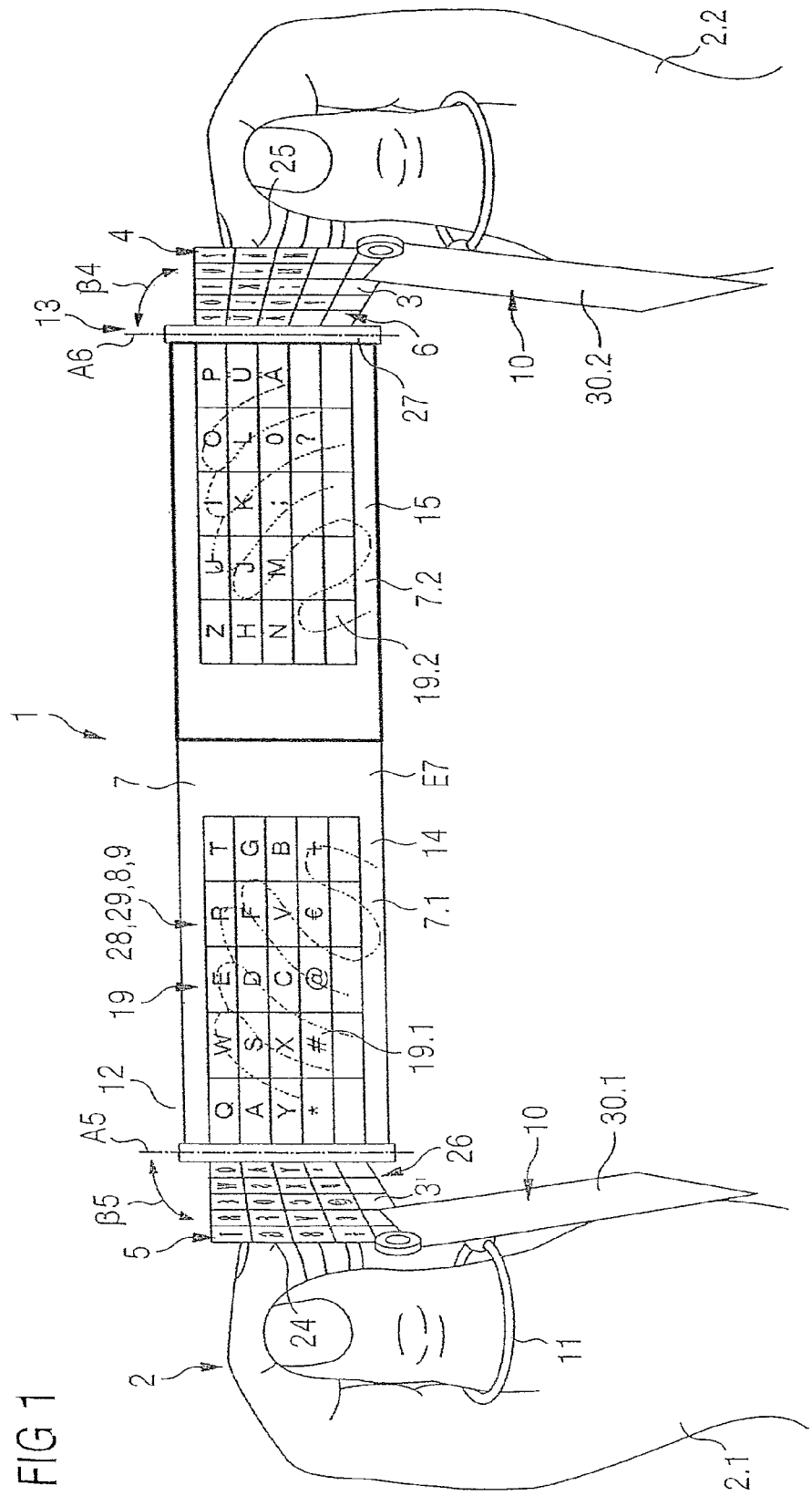
FIG. 1 is a simplified schematic view of a first embodiment of a data processing device input apparatus.

FIG. 1 is a simplified schematic view of the basic construction of a data processing device input apparatus 1, in the working position thereof. There may be seen in this case hands 2 of a person operating the input apparatus, in particular the person's right hand 2.2 and left hand 2.1. The data processing device input apparatus 1 is used for inputting characters, in particular graphics characters, and/or for inputting control instructions by finger contact with input field elements 3 of an input field 4. The input field 4 is divided into two input partial fields 5 and 6, the individual input partial fields 5 and 6 being pivotably articulated to a base 7. The input partial fields 5 and 6 are mounted, set apart from each other in the axial direction, at a corresponding bearing axis A5 and A6 so as to be able to rotate in the direction of operation. The pivotability may be produced, for example, via a hinge connection or other rotary joint connections. The theoretical pivot axes A5 and A6 are in this case arranged parallel to each other, the input partial fields 5 and 6 being articulated to the base 7 so as to be able to be moved at least into a working position characterised by an angle $\beta_5$ and $\beta_6$ relative to the base 7 and the reference plane E7 defined thereby. The individual input partial fields 5 and 6 are in this case oriented, relative to the base surface 7 in the working position illustrated in FIG. 1, substantially in the vertical direction, the input field element 3 of the individual input partial fields 5 and 6 and the input surfaces 24 and 25 formed thereby pointing away from one another and each being oriented toward the inner surface of the operator's hands 2.1, 2.2. The input field 4 is in this case divided into the two input partial fields 5 and 6 in the known manner by dividing a conventional keyboard having a conventional input field at the centre, so the input field elements 3, which are conventionally actuated by the left hand 2.1 or the right hand 2.2, of the individual input partial fields 5 and 6 are also allocated to the respective left and right-hand input partial fields 5 and 6. In other words, the input field elements 3 to be actuated by the right hand 2.2 are allocated to the input partial field 6 arranged on the right-hand side of the base 7, whereas the input field elements 3, which are conventionally actuated by the left hand 2.1 in accordance with the standardised system, are allocated to the input field element 5 arranged on the left-hand side.

The input partial fields 5 and 6 are in this case optionally, or preferably, articulated at their respective end regions 26 and 27 so as to be axially set apart from each other on the base 7. The articulation is produced in the manner of a joint, i.e. the input partial fields 5 and 6 are pivotable relative to the base 7 or a base plane E7 defined thereby, this free pivotability providing individual adaptation for the individual operator with respect to the orientation of the input partial fields 5 and 6 in the vertical direction or in an inclined position relative thereto. A means 28 for displaying the input fields 5 and 6 is provided to allow the operator to detect the input field element 3. The display module 28 comprises a detection or receiving component 29 and reproduction component 8 which is arranged in the region of the base 7 and is either directly formed by or connected to said base. The reproduction component 8 is arranged between the spaced-apart input partial field elements 5 and 6 and is used for displaying the input field element 3 of the individual input partial fields 5 and 6 in the operator's range of vision. For this purpose, component 9 is provided for transmitting a current actual image of the input field element 3 of the input partial fields 5 and 6 from the detection or recording component 29 and for forwarding to the reproduction component 8. The display module 28 may be of various configurations.

FIG. 1 shows an option, or what might be an especially advantageous option, which is simple and requires few components, for embodying the display 28. In this case, detection and recording component 29, reproduction component 28 and the transmission component 9 are formed by a mirror unit 19. In the illustrated case, the mirror element 19 consists, by way of example, of two partial mirrors 19.1, 19.2. The input partial fields 5 and 6 or at least the input surface regions 24 and 25 are transparent so as also to be presented to the user in mirror-inverted form from the back. The correct image is then again issued to the observer as a result of the reflection on the mirror unit 19. The mirror 19 is arranged directly on the base and at the same time also forms the transmission element 9 in that the transparent keys are reflected with the appropriate imprint corresponding to the position of the input partial fields 5 and 6 relative to the individual mirror 19.1 and 19.2 on the base 7. This technology allows the input fields to be imprinted in a manner similar to previous keyboards. As a result of the transparency, the back, as it were, of the input partial field is reflected in such a way that the reflection of the backward, laterally inverted image produces a correct image once more.

The base 7 may be of one-piece configuration or, as illustrated in FIG. 1, be optionally, or especially advantageously, formed from at least two parts—the base partial elements 7.1 and 7.2. The individual base partial elements 7.1 and 7.2 may in this case be displaced in the axial direction relative to each other, especially toward each other, i.e. transversely to the pivot axes A5 and A6, thus allowing the working distance between the hands 2.1 and 2.2 to be varied in the working position in accordance with the operator's body.

There are a plurality of options for configuring the input field elements 3. Depending on the embodiment and operating principle, the inputting may be carried out mechanically by the absorption of pressure, capacitively or by the detection of heat. In the first case, the input field elements are configured as keys or push-buttons and absorb the pressure or the approximation of the fingers via appropriately imprinted keys which are optionally, or preferably, transparent. In the case of capacitive or thermal input, the input surfaces are equipped with glass and capacitive or thermal structures so as to allow inputting.

FIG. 1 further illustrates components 10 for positioning the input partial fields 5 and 6 relative to the base plane E7 of the base 7 in the working position. The configuration of these components may also vary. In the simplest case, positioning is carried out by the operator during actuation itself.

In this case, the operator, in particular his hands 2.1, 2.2, acts as holding components in that the individual input partial fields 5 and 6 are secured, for example, via a loop or another wrap-around element 11. In the illustrated case, the wrap-around element 11 is in the form of a ring and fastened to a holding and support plate 30.1 or 30.2. The holding and support plate 30.1 or 30.2 is used both to support the operator's hands 2.1 and 2.2 and for positional fixing between the hands 2.1, 2.2 and the input field surfaces 24, 25. The holding and support plate 30.1, 30.2 may for this purpose either be arranged rigidly on the input partial fields 5 and 6 or else be simultaneously pivotable relative thereto, thus providing a cover for contact storage in the non-working position. The wrap-around element 11 is large enough to receive a finger, preferably the thumb. Care must be taken to ensure that the holding loop may be positioned appropriately relative to the input fields 5, 6, depending on the desired fixing by specific fingers, for example thumbs or middle fingers, so once the respective finger has passed through the holding loop, the input field element 3 may still be actuated unimpeded. This may allow the operator to carry out inputting even while he is standing.

According to another embodiment (not illustrated), the provision of a locking component allows the working position of the individual input partial fields 5 and 6 to be fixed relative to the base plane E7 of the base 7.

FIG. 1 illustrates an embodiment of an optional, or preferred, solution, in which the base 7 has been configured by adapting the axial distance between the input partial fields 5 and 6, the two input partial fields 5 and 6 being rotatably mounted at the end regions 12 and 13 of the base 7 so as to be set apart from each other and optionally, or preferably, parallel to each other. The base 7 defines in this case two base partial surfaces 14 and 15 arranged in a plane E7. In another conceivable embodiment, the base partial surfaces 14 and 15 are inclined relative to each other, wherein a rigid intermediate element would have to be provided in this case to perform the telescopic function.

In each of these embodiments, the input partial fields 5 and 6 are pivotable, so folding-up provides a compact unit of a data processing device input apparatus 1 that is determined substantially by the dimensions of the base.

Figure 2A:
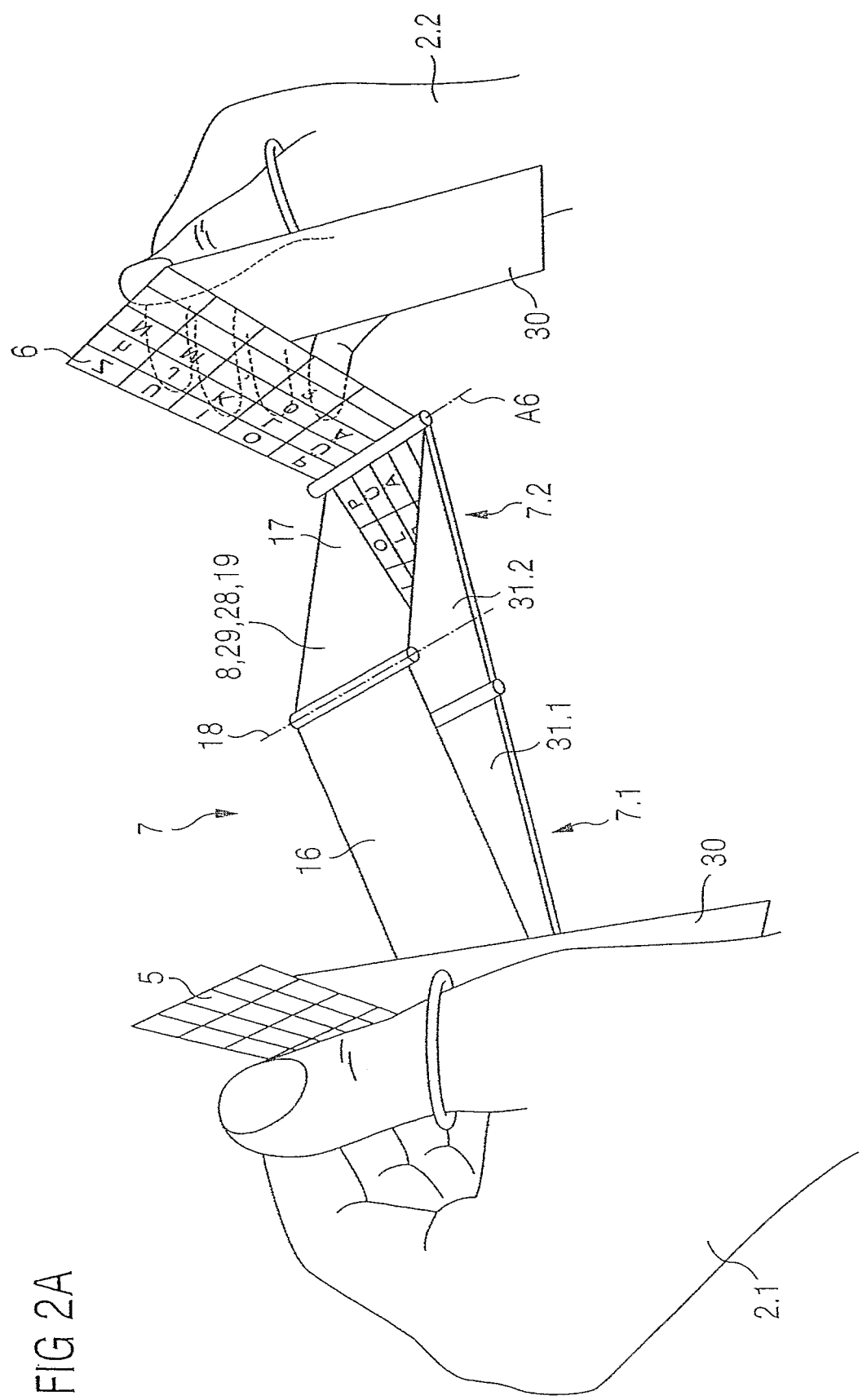
FIG. 2a is a simplified schematic view of a second embodiment of a data processing device input apparatus.

FIG. 2*a*, for its part, illustrates an optional, or possibly especially advantageous, development in which the base 7 is also divided, the division optionally, or preferably, being carried in the centre region, especially centrally, and the individual base partial elements 16 and 17 thus formed are mounted in the central region of the base 7 so as to be pivotable relative to each other about a pivot axis 18. The pivot axis 18 extends in this case parallel to the axes of articulation A5 and A6 for the input partial fields 5 and 6. Optionally, or preferably, the longitudinal regions of the input partial fields 5 and 6 and the base partial elements 16 and 17, which are oriented extending at an angle relative to the pivot axis, are selected so as to allow folding-up in the manner of an accordion, so the overall length of the data processing device input apparatus 1 is characterised by the length and width of an input partial field 5, 6 or the base partial element 17, 18. To protect the mirror units 19.1 and 19.2, plate-like elements 31.1 and 31.2, which are able to pivot about an axis parallel to the axis 18, are also provided parallel to said mirror units. The plate-like elements form, together with the base elements 16 and 17, the respective base partial elements 7.1 and 7.2 of the base 7. If the reproduction component is not in the form of a mirror, the partial elements 31.1 and 31.2 may be dispensed with.

Figure 2B:
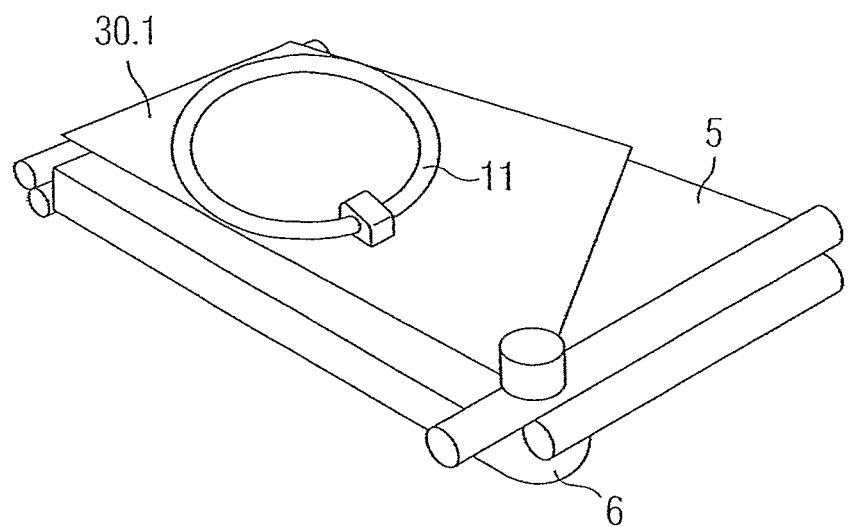
Figure 2C:
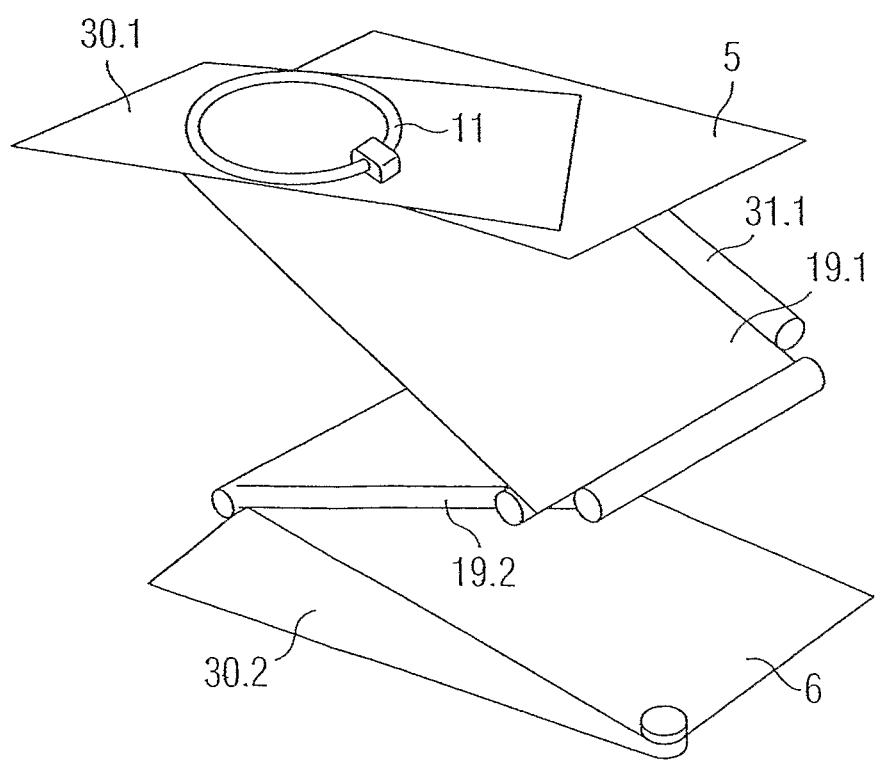
FIG. 2c shows an intermediate state between the working position and transportation position.

FIG. 2*b* illustrates the folded-up state of the data processing device input apparatus 1, FIG. 2*c* an intermediate state before the working position is reached (the input fields 3 not being shown).

As a result of the additional option, represented in FIG. 2*a* to 2*c*, of splitting and thus of changing the angular position of the individual elements, the input partial field 5 and 6 and base partial element 7.1 and 7.2 relative to one another, it is possible, depending on the desired position, to produce at all times a correct mirror image at a corresponding angle, free from distortion.

According to a further possible embodiment in FIG. 3, the reproduction component 8 may be configured as a monitor 20 or projection medium similar to a screen 21, the component 29 for detecting an image being formed by cameras 32.1 and 32.2 which are respectively associated with one of the input partial fields 5 and 6 and produce a real image of the input surfaces 24 and 25. The images are transmitted using transmission means 9, either wirelessly or via appropriate cables. This solution is independent of the viewing angle, which may be an advantage.

According to FIG. 4, the data processing device input apparatus 1 comprises at least one interface 22 which may be arranged in any desired manner. Linking, wirelessly or via a line, to the data processing devices 23, for example a computer or another device, is possible via the interface.

Also possible is an embodiment, as represented in FIG. 5 by way of example in a simplified schematic illustration, in which the data processing device input apparatus 1 is integrated in a corresponding data communication device, for example a mobile radio device 32, thus providing a mobile radio device operation after folding-up. For this purpose, the base 7 may be used at the same time as an input apparatus for the communication device or else the input fields 5 and 6 themselves may be used.

In view of the foregoing description it will be evident to a person skilled in the art that various modifications may be made within the scope of the invention. For example, the sensor material need not be Lead Iodide, but another material having high atomic number and a low boiling point.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

LIST OF REFERENCE NUMERALS

1 Data processing device input apparatus
2, 2.1, 2.2 Hands
3 Input field element
4 Input field
5 Input partial field
6 Input partial field
7 Base
7.1, 7.2 Base partial element
8 Reproduction component
9 Transmission component
10 Positioning component
11 Wrap-around element
12 End region
13 End region
14 Base partial surface
15 Base partial surface 16 Base partial element
17 Base partial element
18 Pivot axis
19 Mirror unit
19.1, 19.2 Mirror
20 Monitor
21 Screen
22 Interface
23 Data processing device
24 Input surface
25 Input surface
26 End region
27 End region
28 Display module
29 Detection component
30 Holding and support plate
31 Plates
32 Mobile radio device
32.1, 32.2 Camera

The invention claimed is:

1. A handheld input device for receiving user input, the user input including at least one of characters or commands, the handheld input device comprising:
 a base;
 a plurality of input elements provided on an input surface of a first input structure and an input surface of a second input structure, the plurality of input elements configured to receive user input, wherein the first input structure is pivotably coupled to a left end of the base and the second input structure is pivotably coupled to a right end of the base so that when the first input structure and the second input structure are each in a vertical position relative to the base, the input surface of the first input structure and the input surface of the second input structure are oriented to face away from each other in opposite directions;
 a reproduction component provided with the base to provide a representation of the plurality of input elements that are provided on the first input structure and the second input structure;
 a first holding component coupled to the first input structure to enable a user to hold the handheld input device with a first hand while making contact with one or more fingers of the first hand on one or more of the plurality input elements provided on the input surface of the first input structure;
 a second holding component coupled to the second input structure to enable the user to hold the handheld input device with a second hand while making contact with one or more fingers of the second hand on one or more of the plurality input elements provided on the input surface of the second input structure; and
 an interface for communicating signals corresponding to the user input received by the plurality of input elements to a data processing device;
 wherein the first holding component and the second holding component each includes (i) a support plate, and (ii) a ring, coupled to the support plate, in which the user can insert a thumb.

2. The handheld input device of claim 1, wherein the plurality of input elements is touch-sensitive.

3. The handheld input device of claim 1, wherein the first input structure and the second input structure are at least partially transparent, and wherein the reproduction component includes at least one or more mirrors to reflect the plurality of input elements provided on the first input structure and the second input structure.

4. The handheld input device of claim 1, wherein the reproduction component includes a display screen to provide an image of the input surface of the first input structure and an image of the input surface of the second input structure.

5. The handheld input device of claim 1, wherein the first holding component is coupled to the first input structure to be pivotable relative to the first input structure, and wherein the second holding component is coupled to the second input structure to be pivotable relative to the second input structure.

6. The handheld input device of claim 1, wherein the interface is a wireless interface for wirelessly communicating signals to the data processing device.

7. The handheld input device of claim 1, wherein the interface enables a wire to connect the handheld input device to the data processing device.

8. A handheld input device coupled to a data processing device, the handheld input device for receiving user input, the user input including at least one of characters or commands, the handheld input device comprising:
 a base;
 a plurality of input elements provided on an input surface of a first input structure and an input surface of a second input structure, the plurality of input elements configured to receive user input, wherein the first input structure is pivotably coupled to a left end of the base and the second input structure is pivotably coupled to a right end of the base so that when the first input structure and the second input structure are each in a vertical position relative to the base, the input surface of the first input structure and the input surface of the second input structure are oriented to face away from each other in opposite directions;
 a reproduction component provided with the base to provide a representation of the plurality of input elements that are provided on the first input structure and the second input structure;
 a first holding component coupled to the first input structure to enable a user to hold the handheld input device with a first hand while making contact with one or more fingers of the first hand on one or more of the plurality input elements provided on the input surface of the first input structure; and
 a second holding component coupled to the second input structure to enable the user to hold the handheld input device with a second hand while making contact with one or more fingers of the second hand on one or more of the plurality input elements provided on the input surface of the second input structure;
 wherein the data processing device is configured to perform radio communications;
 wherein the reproduction component includes a display screen to provide an image of the input surface of the first input structure and an image of the input surface of the second input structure.

9. The handheld input device of claim 8, wherein the plurality of input elements is touch-sensitive.

10. The handheld input device of claim 8, wherein the first holding component is coupled to the first input structure to be pivotable relative to the first input structure, and wherein the second holding component is coupled to the second input structure to be pivotable relative to the second input structure.

11. The handheld input device of claim 8, wherein the first holding component and the second holding component each includes (i) a support plate, and (ii) a ring, coupled to the support plate, in which the user can insert a thumb.

12. A handheld input device for receiving user input, the user input including at least one of characters or commands, the handheld input device comprising:
a base;
a plurality of input elements provided on an input surface of a first input structure and an input surface of a second input structure, the plurality of input elements configured to receive user input, wherein the first input structure is pivotably coupled to a left end of the base and the second input structure is coupled to a right end of the base so that when the first input structure and the second input structure are each in a vertical position relative to the base, the input surface of the first input structure and the input surface of the second input structure are oriented to face away from each other in opposite directions;
a reproduction component provided with the base to provide a representation of the plurality of input elements that are provided on the first input structure and the second input structure;
a first holding component coupled to the first input structure to enable a user to hold the handheld input device with a first hand while making contact with one or more fingers of the first hand on one or more of the plurality input elements provided on the input surface of the first input structure;
a second holding component coupled to the second input structure to enable the user to hold the handheld input device with a second hand while making contact with one or more fingers of the second hand on one or more of the plurality input elements provided on the input surface of the second input structure;
an interface for communicating signals corresponding to the user input received by the plurality of input elements to a data processing device; and
wherein the base is partitioned along its center into two base portions that are pivotable relative to each other, and wherein the handheld input device is foldable about the left end of the base, the right end of the base, and the center of the base;
wherein the first holding component and the second holding component each includes (i) a support plate, and (ii) a ring, coupled to the support plate, in which the user can insert a thumb.

13. The handheld input device of claim 12, wherein the plurality of input elements is touch-sensitive.

14. The handheld input device of claim 12, wherein the interface is a wireless interface for wirelessly communicating signals to the data processing device.

15. The handheld input device of claim 12, the first holding component is coupled to the first input structure to be pivotable relative to the first input structure, and wherein the second holding component is coupled to the second input structure to be pivotable relative to the second input structure.

* * * * *